May 31, 1949. C. L. HAMM 2,471,816
BOBBIN SPINDLE
Filed Jan. 14, 1947
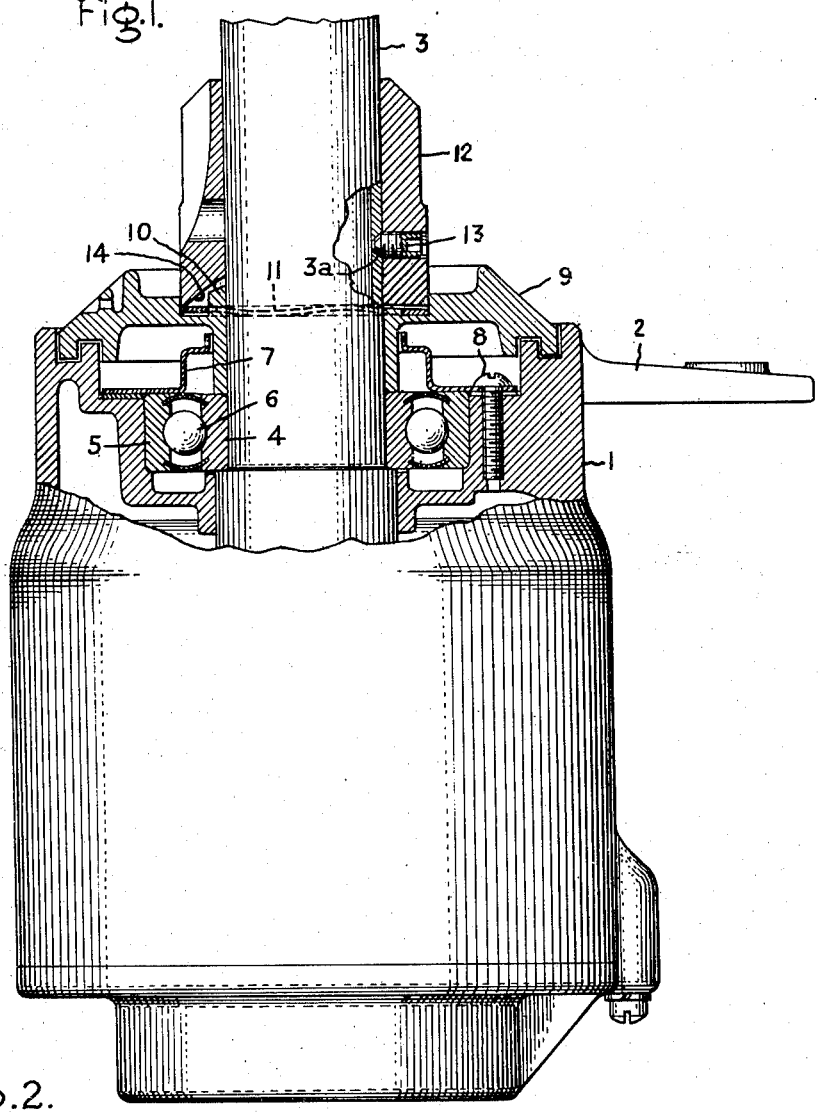
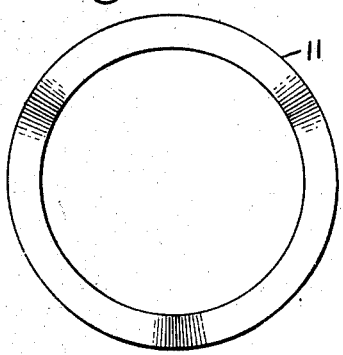
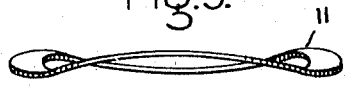
Inventor:
Clarence L. Hamm,
by *Pravell S. Mark*
His Attorney.

Patented May 31, 1949

2,471,816

UNITED STATES PATENT OFFICE 2,471,816

BOBBIN SPINDLE

Clarence L. Hamm, Marblehead, Mass., assignor to General Electric Company, a corporation of New York Application January 14, 1947, Serial No. 721,920

2 Claims. (Cl. 57—129)

My invention relates to rotating machines and more specifically to an assembly-aiding and assembly-locking arrangement for such machines.

The class of machine to which the invention particularly applies is that which includes a member affixed to the shaft of the machine by a setscrew or the equivalent. In the assembly of such machines, it is often found difficult and time-consuming to align the setscrew with the recess provided for it, and this is especially true with modern production methods which require interchangeability of parts made with certain allowable tolerances. There is also a problem in maintaining locking pressure on such a setscrew after assembly.

It is an object of my invention to provide simple and inexpensive means for overcoming these difficulties.

Broadly speaking, the means employed in this connection comprises a resilient washer compressed between the setscrew-retained member and a fixed reference member to facilitate initial positioning of the former and to maintain locking pressure after assembly. Other aspects of the invention will appear from consideration of the following description taken in connection with the accompanying drawing.

In the drawing, Fig. 1 is a side elevational view, partly in section, of a device suitably embodying my invention and including resilient spring washer 11 which is a pressure-yielding device used to separate and restrain parts, as more fully described below; Fig. 2 shows a plan view of said resilient washer and Fig. 3 shows a side view of washer 11 located in the plane in which it is shown in Fig. 1.

I have shown in Fig. 1 the embodiment of my invention in connection with a vertical motor of the type used for driving high speed spinning bobbins. Said motor has a stationary motor frame 1 with a plurality of ears 2 formed on the upper end thereof and adapted to be secured to a framework by bolts in order to support the entire assembly shown. Motor frame 1 has a conventional core portion of magnetic material adapted to excitation by windings (not shown) arranged to react electrodynamically with a rotor contained within the frame. The rotor is not shown, but is assumed to be attached to a vertically extending hollow shaft 3 which is supported by upper and lower bearing units, of which only the upper unit is shown. This unit consists of an inner race 4 arranged in engagement with shaft 3, and an outer race 5 which is fixedly mounted on the motor frame 1. A plurality of antifriction bearing elements 6 are arranged between the races of the bearing, and a lubricant reservoir is formed above the bearing by casing 7. Casing 7 is secured by a plurality of screws 8 to motor frame 1.

The lubricant reservoir casing 7 is not a part of my invention herein claimed, but is part of an invention of mine relating to methods of lubricating a vertical shaft motor claimed in application Serial No. 635,297, filed December 15, 1945, and assigned to the assignee of the present invention.

Immediately above inner bearing race 4 and concentric with shaft 3 is a deflector 9 which at its outer radial extremities forms a labyrinth with the top of a stationary motor frame 1 to prevent the ingress of dirt and other foreign materials. It should be noted that deflector 9 bears downward on inner bearing race 4 which in turn, bears downward upon a shoulder of shaft 3. Therefore, the deflector cannot travel downward with relation to shaft 3.

The inner part of the upper face of deflector 9 is provided with a plurality of ears or bosses 10. These bosses serve to center a resilient washer 11 which is used to separate deflector 9 and a bobbin support 12. Bobbin support 12 serves as a support for a spinning bobbin (not shown) and is secured to shaft 3 by means of a setscrew 13 designed to seat in a hole or recess 3a provided in the shaft. Bobbin support 12 is provided with a plurality of keyways 14 which accommodate a like number of bosses 10. The sides of said keyways act on the bosses to make deflector 9 rotatable with support 12 which, in turn, is rotatable with shaft 3.

Resilient washer 11, as shown in Fig. 1, Fig. 2 and Fig. 3, is formed of spring steel with each axial surface distorted so that no surface lies in a single plane. The deformed shape and the spring material of this washer causes it to yield axially when pressure is applied in that direction. Thus, the washer is a form of compression spring. While I have described and shown a particular construction of a resilient washer, other forms of washer no less resilient and restraining will occur to those skilled in the art.

The above-described parts, i. e., shaft 3, deflector 9, resilient washer 11, and bobbin support 12 having set screw 13 designed to seat in a recess in said shaft, in combination as described, cooperate to aid in their own initial assembly because there is an inherent allowance for slight variation in vertical location of the parts. Thus, the parts fit snugly although the setscrew is raised or lowered to line up properly with the recess provided for it in the shaft. This allows interchangeability of parts and much faster assembly.

In addition, pressure exerted by resilient washer 10 upwardly against bobbin support 12 is transmitted through it to setscrew 13, pressing the latter upward against recess 3a in shaft 3. This serves to exert a locking pressure on setscrew 13.

Thus, there is provided a device of the character described which is capable of meeting the objects hereinabove set forth of aiding initial assembly and locking final assembly of the component parts.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. In a vertical spinning bobbin motor, a rotatable shaft provided with a shoulder, a bearing unit surrounding said shaft and prevented by said shoulder from movement in one axial direction with respect to said shaft, a deflector surrounding said shaft and prevented by said bearing unit from movement in the same axial direction with respect to said shaft, a spinning bobbin support surrounding said shaft and provided with at least one setscrew seatable in a recess in said shaft, and a resilient washer of spring material surrounding said shaft and interposed between said deflector and said bobbin support to separate them in an axial direction.

2. In a rotating machine a rotatable shaft having a recess formed in the periphery thereof and adapted to seat a setscrew, a member surrounding said shaft and provided with a setscrew seated in said recess, means including a shoulder on said shaft axially displaced from said setscrew recess and for affording a fixed reference for the positioning of said member on said shaft, and means including a pressure-yielding deformed washer of spring material interposed between said shaft-surrounding member and said reference-affording means whereby assembly of said parts is facilitated and a snug fit between said parts is assured.

CLARENCE L. HAMM.

REFERENCES CITED

The following references are of record in the file of this patent:

UNITED STATES PATENTS

| Number | Name | Date |
|---|---|---|
| 790,352 | Emmet | May 23, 1905 |
| 955,160 | Holmes | Apr. 19, 1910 |
| 1,172,669 | Caldwell | Feb. 22, 1916 |
| 2,217,656 | Boehme | Oct. 15, 1940 |